(12) United States Patent
Niki et al.

(10) Patent No.: US 12,471,931 B2
(45) Date of Patent: Nov. 18, 2025

(54) TIBIAL RESECTION ASSISTING DEVICE

(71) Applicants: KEIO UNIVERSITY, Tokyo (JP); NAKASHIMA HEALTHFORCE CO., LTD., Okayama (JP)

(72) Inventors: Yasuo Niki, Shinjuku-ku (JP); Keitaro Yamamoto, Okayama (JP); Takaaki Yabuki, Okayama (JP)

(73) Assignees: KEIO UNIVERSITY, Tokyo (JP); NAKASHIMA HEALTHFORCE CO., LTD., Okayama (JP)

( * ) Notice: Subject to any disclaimer, the term of this patent is extended or adjusted under 35 U.S.C. 154(b) by 268 days.

(21) Appl. No.: 18/007,295

(22) PCT Filed: Jul. 28, 2021

(86) PCT No.: PCT/JP2021/027833
§ 371 (c)(1),
(2) Date: Jan. 27, 2023

(87) PCT Pub. No.: WO2022/025094
PCT Pub. Date: Feb. 3, 2022

(65) Prior Publication Data
US 2023/0263537 A1  Aug. 24, 2023

(30) Foreign Application Priority Data
Jul. 29, 2020 (JP) ................. 2020-128344

(51) Int. Cl.
*A61B 17/15* (2006.01)
*A61B 17/17* (2006.01)
*A61F 2/46* (2006.01)
*A61B 90/00* (2016.01)

(52) U.S. Cl.
CPC ........ *A61B 17/157* (2013.01); *A61B 17/1764* (2013.01); *A61F 2/461* (2013.01); *A61B 2090/061* (2016.02); *A61B 2090/0807* (2016.02)

(58) Field of Classification Search
CPC ................ A61B 17/154; A61B 17/155; A61B 2017/0268
See application file for complete search history.

(56) References Cited

U.S. PATENT DOCUMENTS

| 5,911,723 | A | 6/1999 | Ashby et al. |
|---|---|---|---|
| 2006/0184173 | A1 | 8/2006 | Collazo |
| 2014/0288563 | A1 | 9/2014 | Claypool et al. |
| 2018/0085134 | A1 | 3/2018 | Uthgenannt |
| 2019/0358056 | A1 | 11/2019 | Lerat et al. |
| 2020/0060668 | A1 | 2/2020 | Sehat |

*Primary Examiner* — Andrew Yang
(74) *Attorney, Agent, or Firm* — Alleman Hall & Tuttle LLP

(57) ABSTRACT

A tibial resection assisting device includes: a femoral paddle including a first contact surface brought into contact with a resection surface of a distal portion of a femur; and a tibial paddle including a second contact surface brought into contact with a proximal portion of a tibia that is unresected. The femoral paddle is mounted to a base disposed at an anterior side of a knee joint. A movable body mounted to the base is movable in an orthogonal direction to the first contact surface. The tibial paddle is mounted to the movable body and is swingable about a swing shaft that extends in an anterior-posterior direction of the knee joint, the anterior-posterior direction being parallel to the first contact surface. Further, a reference guide mounted to the base is movable in the orthogonal direction and is intended for positioning a tibial cutting guide.

7 Claims, 10 Drawing Sheets

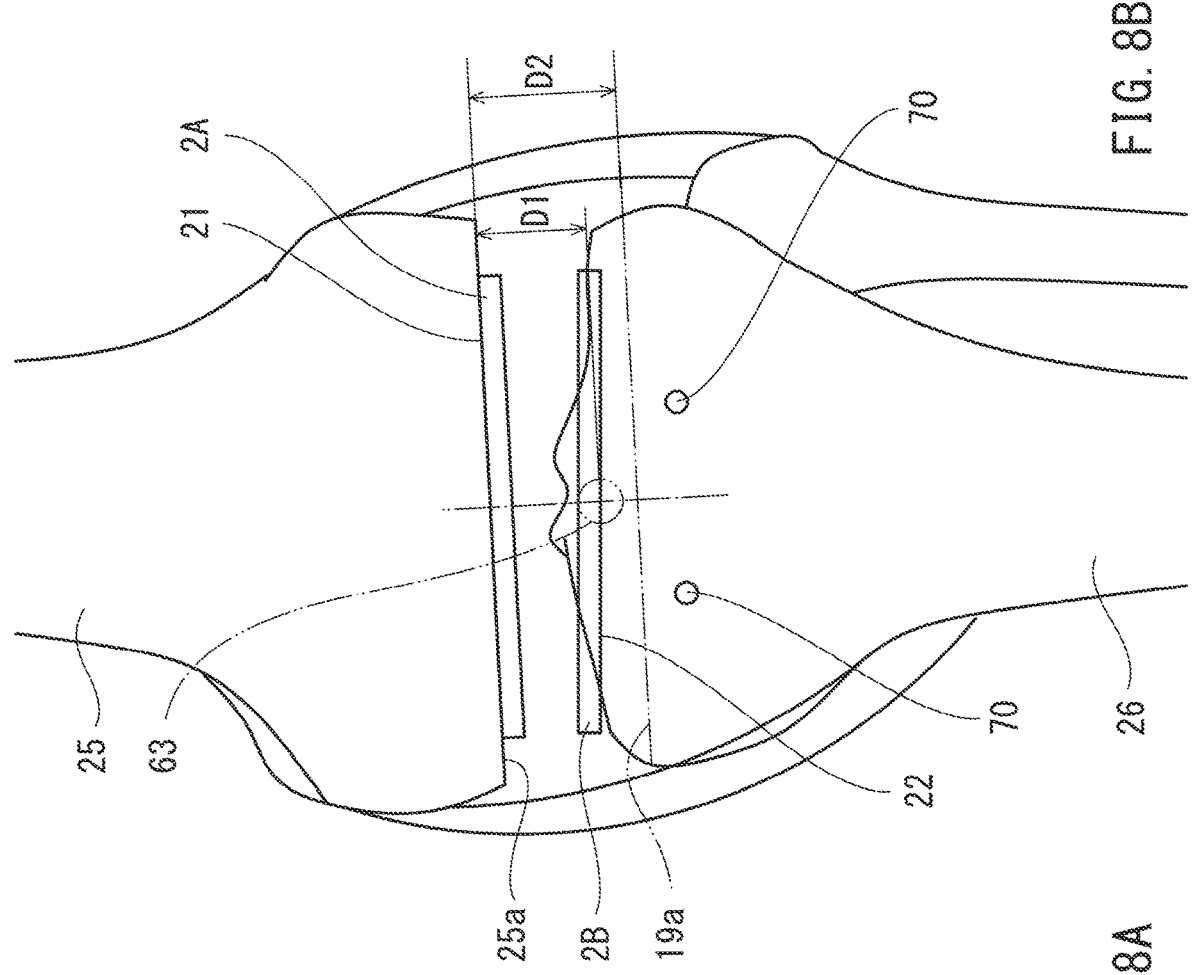
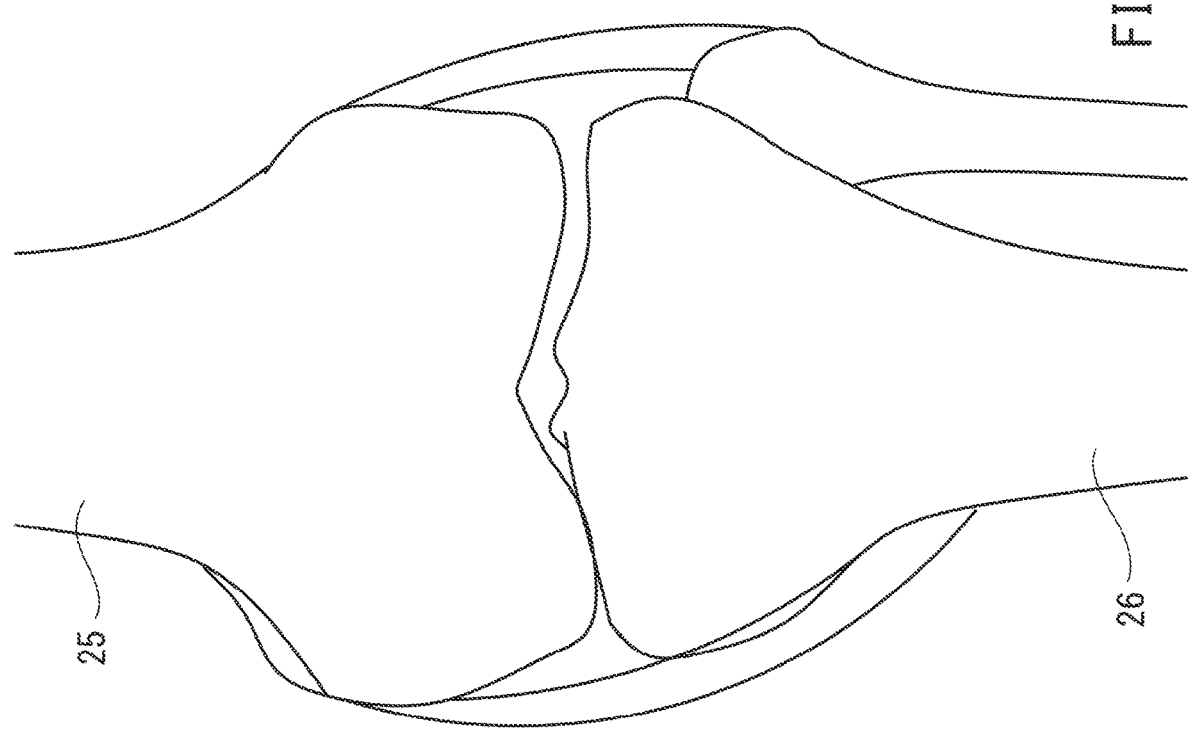

TIBIAL RESECTION ASSISTING DEVICE

TECHNICAL FIELD

The present invention relates to a tibial resection assisting device for use in total knee arthroplasty.

BACKGROUND ART

In total knee arthroplasty (TKA), the distal portion of a femur and the proximal portion of a tibia are resected, and a femoral component and a tibial component of an artificial knee joint are attached to their respective resection surfaces.

For example, Patent Literature 1 discloses a surgical operation device for use in total knee arthroplasty. The surgical operation device is a femoral resection assisting device intended for positioning a femoral cutting guide that is used when resecting the distal portion of a femur after resecting the proximal portion of a tibia.

Specifically, the surgical operation device disclosed in Patent Literature 1 includes: a base disposed at the anterior side of a knee joint; a tibial paddle (referred to as a "first tissue engager" in Patent Literature 1) mounted to the base; and a femoral paddle (referred to as a "second tissue engager" in Patent Literature 1) facing the tibial paddle. The tibial paddle includes a contact surface (referred to as a "tissue engagement surface" in Patent Literature 1) that is brought into contact with a resection surface of the proximal portion of the tibia. The femoral paddle includes a contact surface (referred to as a "tissue engagement surface" in Patent Literature 1) that is brought into contact with the distal portion (femoral condyles) of the femur that is unresected.

The femoral paddle is mounted to a head such that the femoral paddle is swingable about a swing shaft that extends in the anterior-posterior direction of the knee joint, the anterior-posterior direction being parallel to the contact surface of the tibial paddle. The head is mounted to the base such that the head is movable in a direction orthogonal to the contact surface of the tibial paddle.

Further, a drill guide is mounted to the base such that the drill guide is movable in the direction orthogonal to the contact surface of the tibial paddle. The drill guide is intended for positioning the femoral cutting guide.

To be more specific, the drill guide is provided with a pair of through-holes extending in the anterior-posterior direction of the knee joint, the anterior-posterior direction being parallel to the contact surface of the tibial paddle. A method of using the surgical operation device is as follows. After the proximal portion of the tibia is resected, the tibial paddle and the femoral paddle are inserted between a resulting resection surface of the proximal portion of the tibia and the distal portion of the femur that is unresected; and the head is moved to move the femoral paddle away from the tibial paddle. The drill guide moves together with the head. Thereafter, a pair of drill holes is formed in the femur through the through-holes of the drill guide, and drill pins are inserted in these drill holes. After the femoral resection assisting device is removed, the femoral cutting guide is attached to the drill pins driven into the femur, and the femur is resected by a saw along a slit of the femoral cutting guide.

CITATION LIST

Patent Literature

PTL 1: Japanese Laid-Open Patent Application Publication No. H10-137273

SUMMARY OF INVENTION

Technical Problem

In the case of using the femoral resection assisting device disclosed in Patent Literature 1, by expanding the space between the femoral paddle and the tibial paddle, suitable tensile force can be applied to the soft tissues around the knee joint, such as the collateral ligaments, and in such a state, the position of a resection surface of the distal portion of the femur can be set. In addition, since the femoral paddle is swingable and the angle between the contact surface of the femoral paddle and the contact surface of the tibial paddle is changeable, which of the following is greater can be known: the degree of extension of the soft tissues, to which the tensile force is applied, at the medial side (the side closer to the midline of a human body) of the knee joint; or the degree of extension of the soft tissues, to which the tensile force is applied, at the lateral side (the side farther from the midline of the human body) of the knee joint.

In the case of the femoral resection assisting device disclosed in Patent Literature 1, first, the proximal portion of the tibia is resected, and the resulting resection surface thereof is used as a reference surface. However, the flexion axis of the knee joint is positioned at the femur side. For this reason, there is a demand for, first, resecting the distal portion of the femur in parallel to the flexion axis, and then, while using a resulting resection surface of the distal portion of the femur as a reference surface, setting the position of a resection surface of the proximal portion of the tibia.

In view of the above, an object of the present invention is to provide a tibial resection assisting device that makes it possible to use a resection surface of the distal portion of a femur as a reference surface.

Solution to Problem

In order to solve the above-described problem, a tibial resection assisting device according to the present invention is a tibial resection assisting device for use in total knee arthroplasty, the tibial resection assisting device including: a base disposed at an anterior side of a knee joint; a femoral paddle mounted to the base, the femoral paddle including a first contact surface that is brought into contact with a resection surface of a distal portion of a femur; a movable body mounted to the base such that the movable body is movable in a direction orthogonal to the first contact surface; a tibial paddle including a second contact surface that is brought into contact with a proximal portion of a tibia that is unresected, the tibial paddle being mounted to the movable body, such that the tibial paddle is swingable about a swing shaft that extends in an anterior-posterior direction of the knee joint, the anterior-posterior direction being parallel to the first contact surface; a driving mechanism that moves the movable body in accordance with an operation amount; and a reference guide intended for positioning a tibial cutting guide that is used when resecting the proximal portion of the tibia, the reference guide being mounted to the base such that the reference guide is movable in the direction orthogonal to the first contact surface.

According to the above-described configuration, the first contact surface of the femoral paddle is brought into contact with the resection surface of the distal portion of the femur, and the reference guide intended for positioning the tibial cutting guide is movable in the direction orthogonal to the first contact surface. Therefore, after resecting the distal portion of the femur, while using the resulting resection surface of the distal portion of the femur as a reference surface, the position of a resection surface of the proximal portion of the tibia can be set. Moreover, since the movable body, to which the tibial paddle is mounted, is movable in the direction orthogonal to the first contact surface, by expanding the space between the femoral paddle and the tibial paddle, suitable tensile force can be applied to the soft tissues around the knee joint, such as the collateral ligaments, and in such a state, the position of the resection surface of the proximal portion of the tibia can be set. Furthermore, since the tibial paddle is swingable and the angle between the contact surface of the femoral paddle and the contact surface of the tibial paddle is changeable, which of the following is greater can be known: the degree of extension of the soft tissues, to which the tensile force is applied, at the medial side of the knee joint; or the degree of extension of the soft tissues, to which the tensile force is applied, at the lateral side of the knee joint.

The reference guide may be movable independently of the movable body. According to this configuration, the position of the resection surface of the proximal portion of the tibia can be set regardless of the distance from the first contact surface of the femoral paddle to the second contact surface of the tibial paddle.

The reference guide may include a pair of through-holes, in which either a pair of positioning pins driven into the tibia, or a drill, is inserted, and the tibial cutting guide may be positioned by either the pair of positioning pins or a pair of drill holes formed by the drill.

The above tibial resection assisting device may further include: a first distance indicator that indicates a distance from the first contact surface to the second contact surface; and a second distance indicator that indicates a distance from the first contact surface to a saw guide surface of the tibial cutting guide. According to this configuration, the surgeon can operate the driving mechanism while checking, with the first distance indicator, the distance from the first contact surface to the second contact surface, and also, can move the reference guide to a desired position by referring to the second distance indicator.

The swing shaft may be a first swing shaft. The above tibial resection assisting device may further include an alignment unit that is attachable to and removable from either the movable body or the base, the alignment unit including: an alignment bar that is swingable about a second swing shaft parallel to the first swing shaft; and an angle indicator that indicates an angle, about the second swing shaft, between the direction orthogonal to the first contact surface and an extending direction of the alignment bar. According to this configuration, by bringing the center line of the alignment bar into coincidence with a tibial axis as seen from the anterior side of the knee joint, the angle of the first contact surface of the femoral paddle relative to the direction orthogonal to the tibial axis can be known. Since the alignment unit including the alignment bar is attachable to and removable from the movable body or the base, the insertion of the femoral paddle and the tibial paddle between the femur and the tibia and the operation of the driving mechanism can be performed in a state where the alignment unit is removed from the movable body or the base.

The angle indicator may be a first angle indicator. The alignment bar, which is swingable about the second swing shaft, may be swingable also about a third swing shaft, which extends in a lateral direction of the knee joint. The alignment unit may include a second angle indicator that indicates an angle, about the third swing shaft, between the direction orthogonal to the first contact surface and the extending direction of the alignment bar. According to this configuration, by making the center line of the alignment bar parallel to the tibial axis as seen from a lateral side of the knee joint, the angle of the first contact surface of the femoral paddle relative to the direction orthogonal to the tibial axis can be known.

The above tibial resection assisting device may further include an angle fixing mechanism capable of fixing an angle between the first contact surface and the second contact surface. According to this configuration, after the orientation of the tibial paddle is adjusted, the resulting state can be maintained.

Advantageous Effects of Invention

The present invention provides a tibial resection assisting device that makes it possible to use a resection surface of the distal portion of a femur as a reference surface.

BRIEF DESCRIPTION OF DRAWINGS

FIG. 8A shows the distal portion of an unresected femur and the proximal portion of an unresected tibia, and FIG. 8B is a diagram for describing a method of using the tibial resection assisting device.

DESCRIPTION OF EMBODIMENTS

Figure 1:
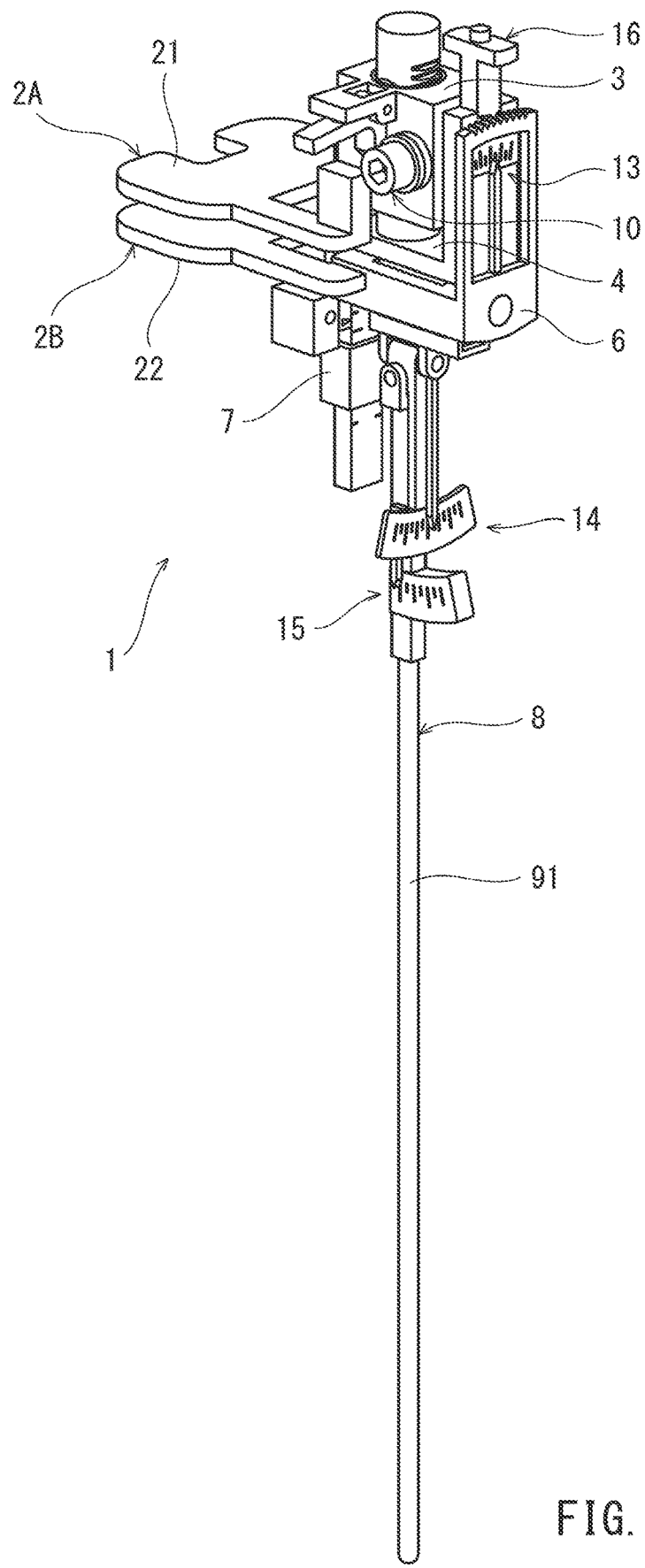
FIG. 1 is a perspective view of a tibial resection assisting device according to one embodiment of the present invention.
Figure 2:
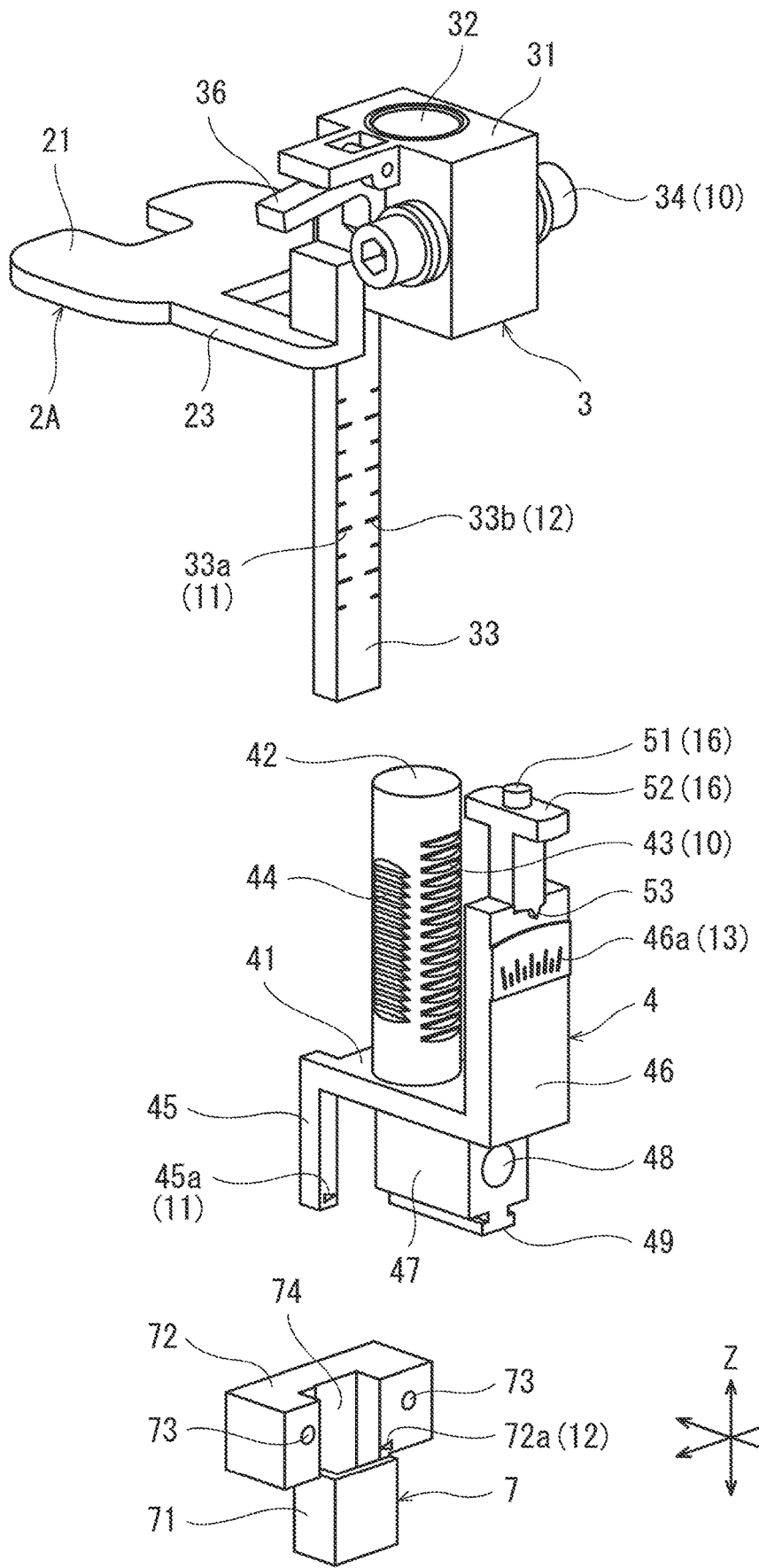
FIG. 2 is a perspective view showing a base to which a femoral paddle is mounted, a movable body, and a reference guide.
Figure 3:
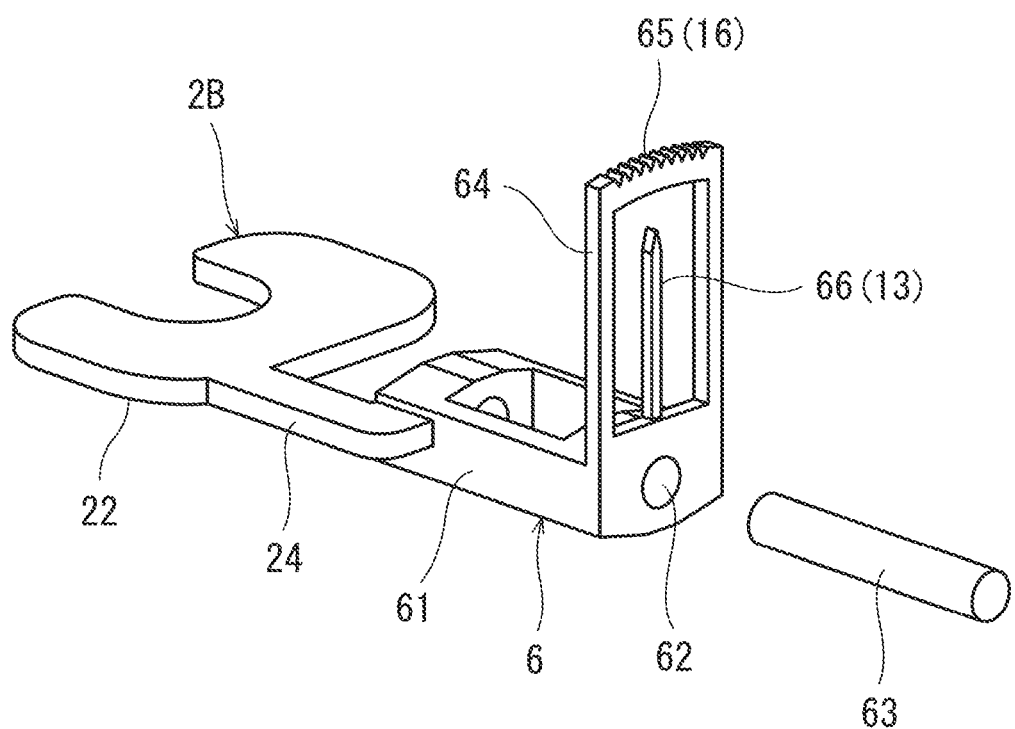
FIG. 3 is a perspective view showing a swing body to which a tibial paddle is mounted and a first swing shaft.

FIG. 1 shows a tibial resection assisting device 1 for use in total knee arthroplasty according to one embodiment of the present invention. As shown in FIGS. 8A and 8B, the tibial resection assisting device 1 is intended for positioning a tibial cutting guide 17 (see FIGS. 10A and 10B), which is used when resecting the proximal portion of a tibia 26 after resecting the distal portion of a femur 25.

Specifically, as shown in FIGS. 1 to 7, the tibial resection assisting device 1 includes: a base 3 disposed at the anterior side of a knee joint; a femoral paddle 2A mounted to the base 3; and a tibial paddle 2B facing the femoral paddle 2A. The tibial resection assisting device 1 further includes: a movable body 4, to which the tibial paddle 2B is mounted via a swing body 6; a driving mechanism 10, which moves the movable body 4; a reference guide 7 mounted to the base 3; and an alignment unit 8.

The femoral paddle 2A and the tibial paddle 2B are to be inserted between the femur 25 and the tibia 26. The femoral paddle 2A includes a first contact surface 21, which is brought into contact with a resection surface 25a (see FIG. 8B) of the distal portion of the femur 25, and the tibial paddle 2B includes a second contact surface 22, which is brought into contact with the proximal portion of the tibia 26, which is unresected, as shown in FIG. 8B.

Hereinafter, for the sake of convenience of the description, as indicated in FIGS. 2 to 7, the anterior-posterior direction of the knee joint, the anterior-posterior direction being parallel to the first contact surface 21, is referred to as "X-direction"; the lateral direction of the knee joint is referred to as "Y-direction"; and the direction orthogonal to the first contact surface 21 is referred to as "Z-direction".

The base 3 includes a main part 31. The main part 31 is, when seen in the Z-direction, positioned on an extension line of an X-direction center line of the femoral paddle 2A, the X-direction center line passing through the center of the femoral paddle 2A in the Y-direction. In the present embodiment, the main part 31 is in the shape of a rectangular parallelepiped. However, the shape of the main part 31 is not particularly limited. The main part 31 is provided with a support hole 32, which penetrates the main part 31 in the Z-direction.

The femoral paddle 2A is mounted to the main part 31 by an arm 23 extending in the X-direction. In the present embodiment, the arm 23 is positioned such that it is shifted from the X-direction center line of the femoral paddle 2A. Alternatively, the arm 23 may be positioned on the X-direction center line of the femoral paddle 2A.

The base 3 further includes a plate-shaped pillar 33 between the femoral paddle 2A and the main part 31. The plate-shaped pillar 33 is flattened in the X-direction and extends downward in the Z-direction from the main part 31.

The movable body 4 includes a plate-shaped main part 41 and a rod 42. The main part 41 is positioned below the main part 31 of the base 3, and is flattened in the Z-direction. The rod 42 protrudes upward in the Z-direction from the main part 41. The rod 42 is inserted in the support hole 32 of the main part 31 of the base 3, and thereby the movable body 4 is mounted to the base 3 such that the movable body 4 is movable in the Z-direction.

On one side of the peripheral surface of the rod 42 in the X-direction (i.e., on the opposite side of the peripheral surface of the rod 42 from the femoral paddle 2A), a toothed surface 43 is formed. The toothed surface 43 includes recesses and protrusions that are alternately arranged in the Z-direction. An operating shaft 34, which penetrates the main part 31 in the Y-direction, is rotatably held by the main part 31 of the base 3. The operating shaft 34 is operated by a user, such as a surgeon.

Figure 6:
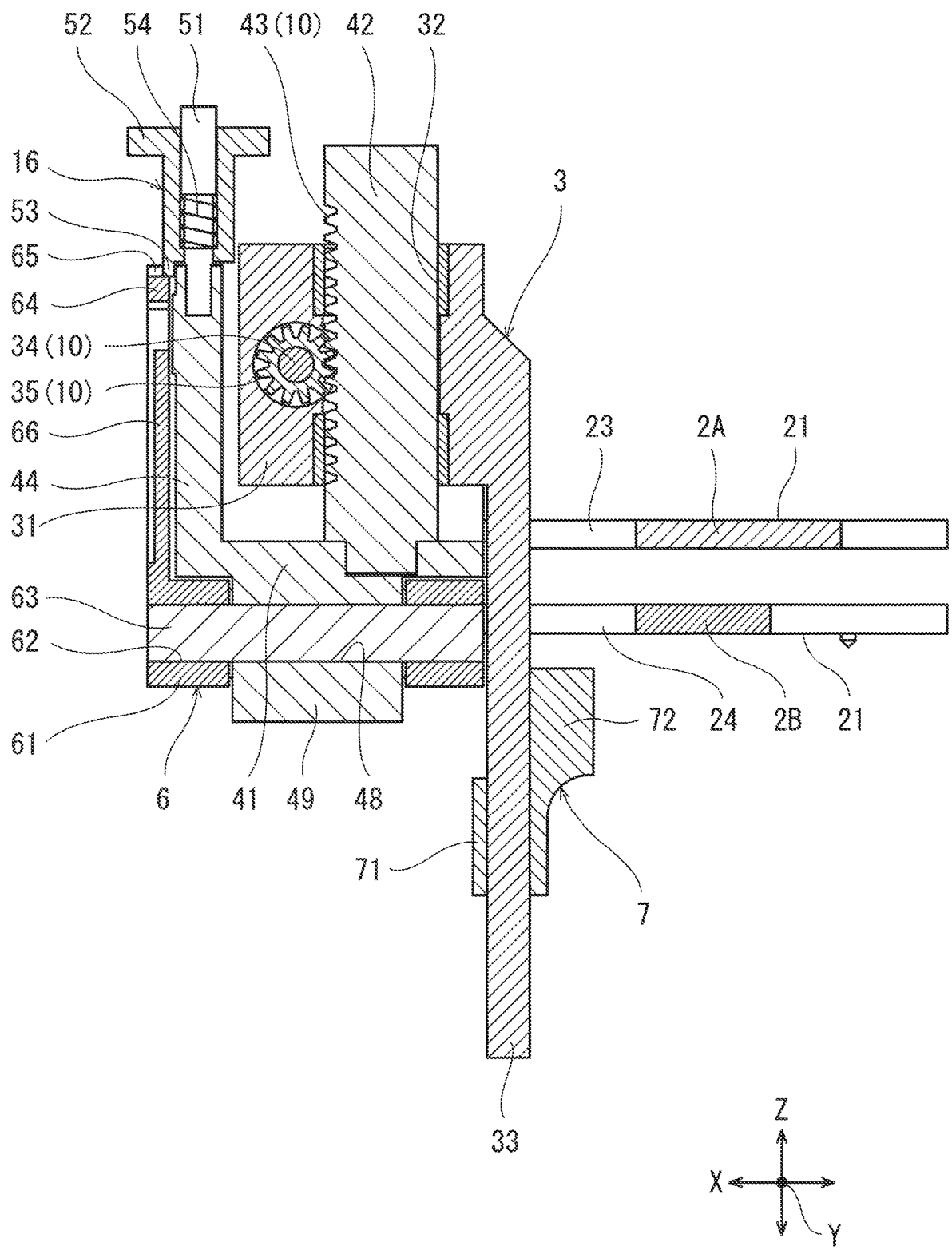
FIG. 6 is a sectional view taken along line VI-VI of FIG. 5.

As shown in FIG. 6, a pinion 35, which meshes with the toothed surface 43, is provided at the middle of the operating shaft 34. Accordingly, when the operating shaft 34 is operated, the movable body 4 moves in the Z-direction in accordance with an operation amount (rotation amount) of the operating shaft 34. That is, the operating shaft 34, the pinion 35, and the toothed surface 43 form the driving mechanism 10, which moves the movable body 4 in accordance with the operation amount.

On one side of the peripheral surface of the rod 42 in the Y-direction (in FIG. 2, on the lower left side of the peripheral surface of the rod 42), a plurality of teeth 44 arranged in the Z-direction are formed. Each tooth 44 has a triangular sectional shape whose vertex protrudes toward one side of the Y-direction, and the vertex is directed relatively upward.

Figure 7:
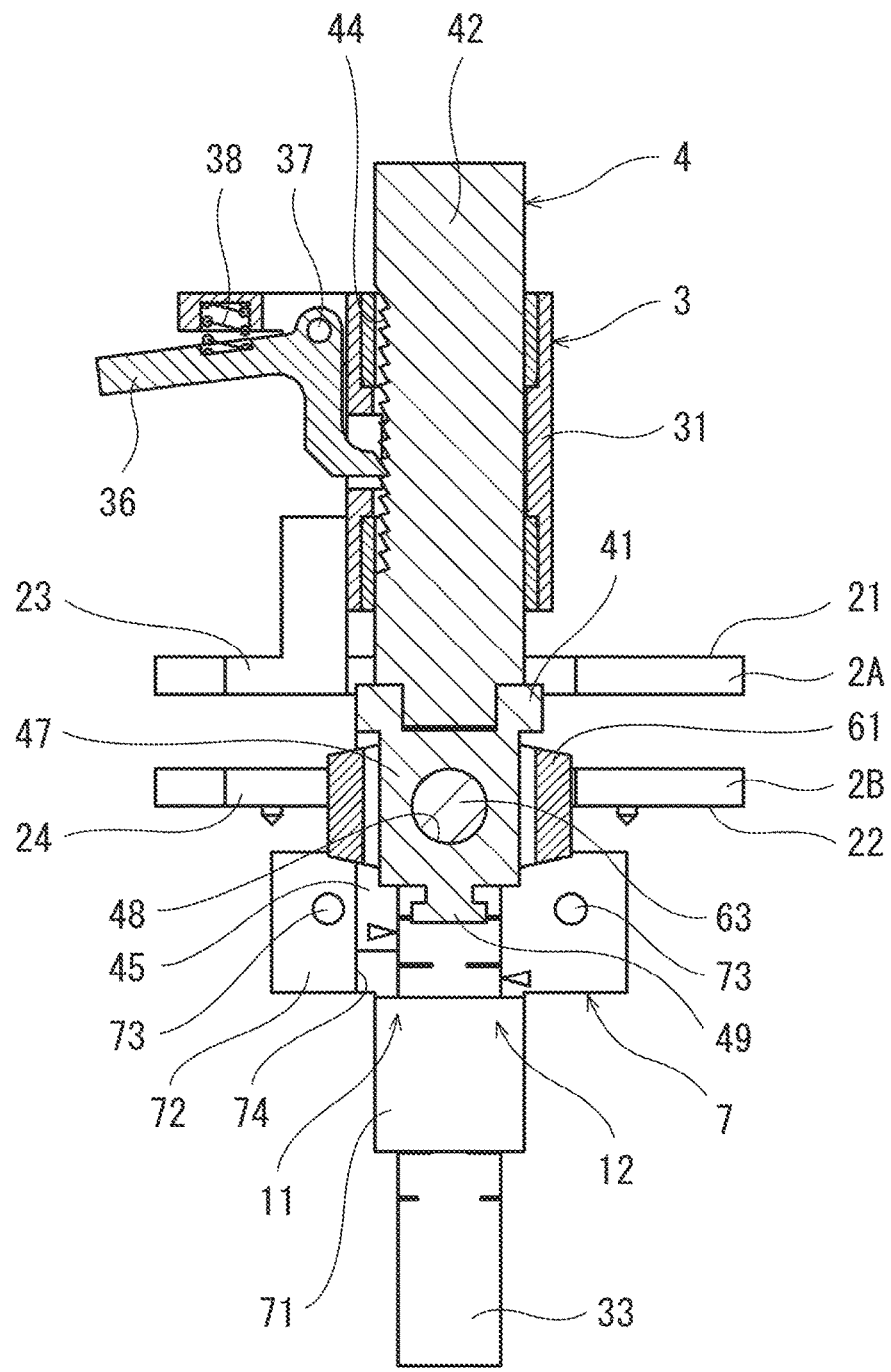
FIG. 7 is a sectional view taken along line VII-VII of FIG. 5.

As shown in FIG. 7, a ratchet lever 36, which is engaged with one tooth 44, is swingably mounted to the main part 31 of the base 3 via a shaft 37.

The ratchet lever 36 is urged by a spring 38 in such a direction that the engaged state with the one tooth 44 is maintained. According to such a structure, the rod 42 is movable downward relative to the base 3, but not movable upward unless the ratchet lever 36 is operated.

The movable body 4 further includes a block 47 and a leg 45. The block 47 protrudes downward from the middle of the main part 41. The leg 45 protrudes downward from one corner of the main part 41 along one side surface of the pillar 33 of the base 3 (in the present embodiment, one side surface on the arm 23 side). In the present embodiment, the block 47 is in the shape of a rectangular parallelepiped, and the block 47 is provide with a through-hole 48 extending in the X-direction. A rail 49 having an inverted T-shaped cross section and extending in the X-direction is provided on the lower surface of the block 47.

The swing body 6 includes a quadrangular ring-shaped frame 61, in which the block 47 of the movable body 4 is inserted. The tibial paddle 2B is mounted to the frame 61 by an arm 24 extending in the X-direction. In the present embodiment, the arm 24 is positioned in such a manner that the arm 24 and the arm 23 on the femoral paddle 2A side face each other, such that the position of the arm 24 is shifted from the X-direction center line of the tibial paddle 2B, which passes through the center of the tibial paddle 2B in the Y-direction. Alternatively, the arm 24 may be positioned on the X-direction center line of the tibial paddle 2B.

The frame 61 is provided with a through-hole 62 extending in the X-direction. As a result of a first swing shaft 63, which extends in the X-direction, being inserted in the through-hole 62 of the frame 61 and the through-hole 48 of the block 47, the tibial paddle 2B is mounted to the movable body 4 via the swing body 6, such that the tibial paddle 2B is swingable about the first swing shaft 63. It should be noted that when seen in the X-direction, the second contact surface 22 of the tibial paddle 2B passes through the center line of the first swing shaft 63.

On a surface on one side of the pillar 33 of the base 3 in the X-direction (i.e., on a surface on the opposite side of the pillar 33 from the femoral paddle 2A), graduations 33a are formed. The graduations 33a relate to a distance D1 (see FIG. 8B) from the first contact surface 21 of the femoral paddle 2A to the second contact surface 22 of the tibial paddle 2B. Since the tibial paddle 2B is swingable as described above, the distance D1 is a distance between the first contact surface 21 and an extension line of the center line of the first swing shaft 63 on the second contact surface 22. On the leg 45 of the movable body 4, a mark 45a indicating the current position of the second contact surface 22 (the extension line of the center line of the first swing shaft 63) is formed. These graduations 33a and mark 45a form a first distance indicator 11, which indicates the distance D1 from the first contact surface 21 of the femoral paddle 2A to the second contact surface 22 of the tibial paddle 2B.

The frame 61 of the swing body 6 is provided with a hollow (gate-shaped) pendulum 64, which protrudes upward from one side of the frame 61 in the X-direction (specifically, from a far side of the frame 61 from the tibial paddle 2B). A plurality of grooves 65, which are arranged in the circumferential direction about the first swing shaft 63, are formed on the distal end of the pendulum 64.

The main part 41 of the movable body 4 is provided with a wall 46, which protrudes upward from one end of the main part 41 in the X-direction (specifically, from a far end of the main part 41 from the tibial paddle 2B) along the pendulum 64. The distal end of the wall 46 is provided with a locking member 52, which includes a protrusion 53 fittable to one groove 65.

As shown in FIG. 6, the locking member 52 is slidable along a shaft 51, which is fixed to the wall 46 and which extends in the Z-direction. The locking member 52 is urged downward by a spring 54. A recess for non-rotatably holding the locking member 52 is formed on the upper surface of the wall 46. A state where the locking member 52 is pulled up from the recess against the urging force of the spring 54 and the locking member 52 is rotated (e.g., rotated by 90 degrees from the state shown in FIG. 5) such that the protrusion 53 is in contact with the upper surface of the wall 46 is a normal state. That is, in the normal state, the tibial paddle 2B is freely swingable.

Figure 5:
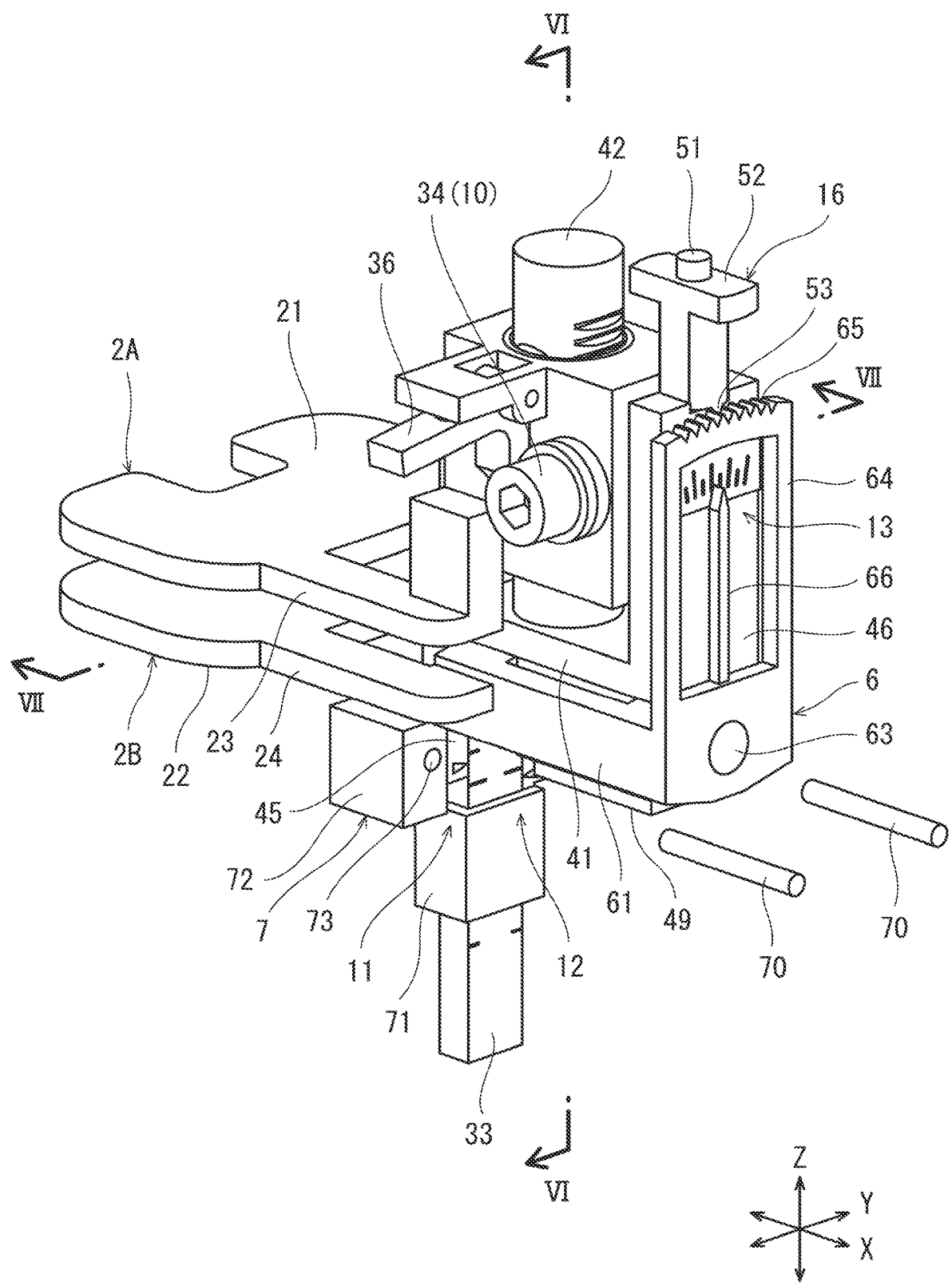
FIG. 5 is a perspective view of the tibial resection assisting device from which the alignment unit has been removed.

When the locking member 52 is rotated from the normal state into the state shown in FIG. 5 such that the protrusion 53 is fitted to one groove 65, the tibial paddle 2B becomes non-swingable. At the time, the locking member 52 is fitted into the recess formed on the upper surface of the wall 46. That is, the shaft 51, the spring 54, the locking member 52, and the grooves 65 form an angle fixing mechanism 16 capable of fixing a paddle-to-paddle angle, i.e., an angle between the first contact surface 21 of the femoral paddle 2A and the second contact surface 22 of the tibial paddle 2B. With the angle fixing mechanism 16, after the orientation of the tibial paddle 2B (i.e., a swing angle) is adjusted, the resulting state can be maintained. It should be noted that the configuration of the angle fixing mechanism 16 is not limited to this example, but may be changed as necessary.

Graduations 46a relating to the paddle-to-paddle angle are formed on one surface of the wall 46 (specifically, on a surface on the opposite side of the wall 46 from the tibial paddle 2B). A pointer 66, which indicates the current angle of the second contact surface 22 of the tibial paddle 2B, is provided inside the pendulum 64. These graduations 46a and pointer 66 form a paddle-to-paddle angle indicator 13, which indicates the paddle-to-paddle angle.

The reference guide 7 is mounted to the pillar 33 of the base 3 such that the reference guide 7 is movable in the Z-direction. In the present embodiment, the reference guide 7 is movable in the Z-direction independently of the movable body 4. The reference guide 7 can be fixed at an arbitrary position relative to the pillar 33 by an unshown fixing screw.

To be more specific, the reference guide 7 includes a tubular part 71 and a guiding part 72. The tubular part 71 is fitted to the pillar 33 of the base 3, and is slidable along the pillar 33. The guiding part 72 is positioned above the tubular part 71, and a groove 74 continuous with the internal space of the tubular part 71 is formed in the guiding part 72. The width of the groove 74 is greater than the width of the pillar 33, and the pillar 33 and the leg 45 are inserted in the groove 74.

Figure 10A:
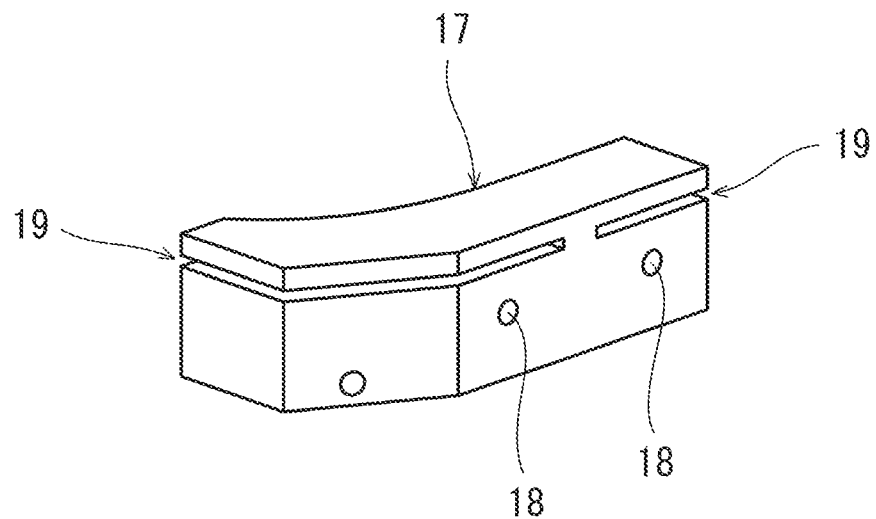
FIG. 10A is a perspective view of a tibial cutting guide.
Figure 10B:
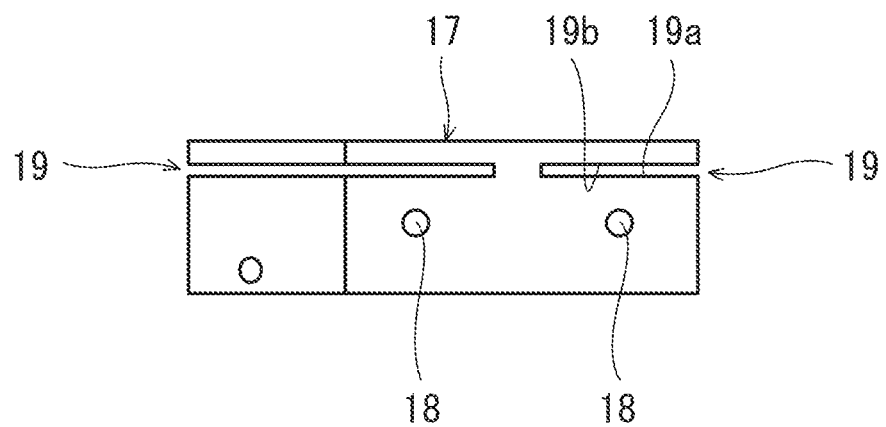
FIG. 10B is a front view of the tibial cutting guide.

The reference guide 7 is intended for positioning the tibial cutting guide 17. As shown in FIGS. 10A and 10B, the tibial cutting guide 17 is provided with slits 19. A bone-cutting saw is to be inserted in the slits 19. That is, the lower surfaces of the respective slits 19 collectively serve as a saw guide surface 19a, and the upper surfaces of the respective slits 19 collectively serve as a saw holding surface 19b. It should be noted that it is not essential that the tibial cutting guide 17 be provided with the slits 19. Instead of including both the saw guide surface 19a and the saw holding surface 19b, the tibial cutting guide 17 may include only the saw guide surface 19a.

In the present embodiment, as shown in FIG. 8B, the tibial cutting guide 17 is positioned by a pair of positioning pins 70 driven into the tibia 26. Specifically, as shown in FIGS. 10A and 10B, the tibial cutting guide 17 includes a pair of through-holes 18, in which the positioning pins 70 are inserted, respectively. It should be noted that the positioning pins 70 may be simple cylindrical objects, or screws or nails may be used as the positioning pins 70.

The guiding part 72 of the reference guide 7 is provided with a pair of through-holes 73 extending in the X-direction. The through-holes 73 are positioned on both sides of the groove 74, and are arranged in the Y-direction. The diameter of each through-hole 73 is substantially equal to the diameter of each positioning pin 70. The upper surface of the guiding part 72 is parallel to the first contact surface 21 of the femoral paddle 1A.

The distance from the through-holes 73 to the upper surface of the guiding part 72 is equal to the distance from the through-holes 18 to the saw guide surface 19a of the tibial cutting guide 17. That is, the position of the saw guide surface 19a when the tibial cutting guide 17 has been set later is indicated by the position of the upper surface of the guiding part 72 of the reference guide 7. Accordingly, the position of the upper surface of the guiding part 72 of the reference guide 7 serves as a rough indication of a tibial resection position.

On a surface on one side of the pillar 33 of the base 3 in the X-direction (specifically, on a surface on the opposite side of the pillar 33 from the femoral paddle 2A), graduations 33b are formed. The graduations 33b relate to a distance D2 (see FIG. 8B) from the first contact surface 21 of the femoral paddle 2A to the saw guide surface 19a of the tibial cutting guide 17 (i.e., the upper surface of the guiding part 72 of the reference guide 7). On the guiding part 72, a mark 72a indicating the current position of the upper surface of the guiding part 72 is formed. These graduations 33b and mark 72a form a second distance indicator 12, which indicates the distance D2 from the first contact surface 21 of the femoral paddle 2A to the saw guide surface 19a of the tibial cutting guide 17.

Figure 4:
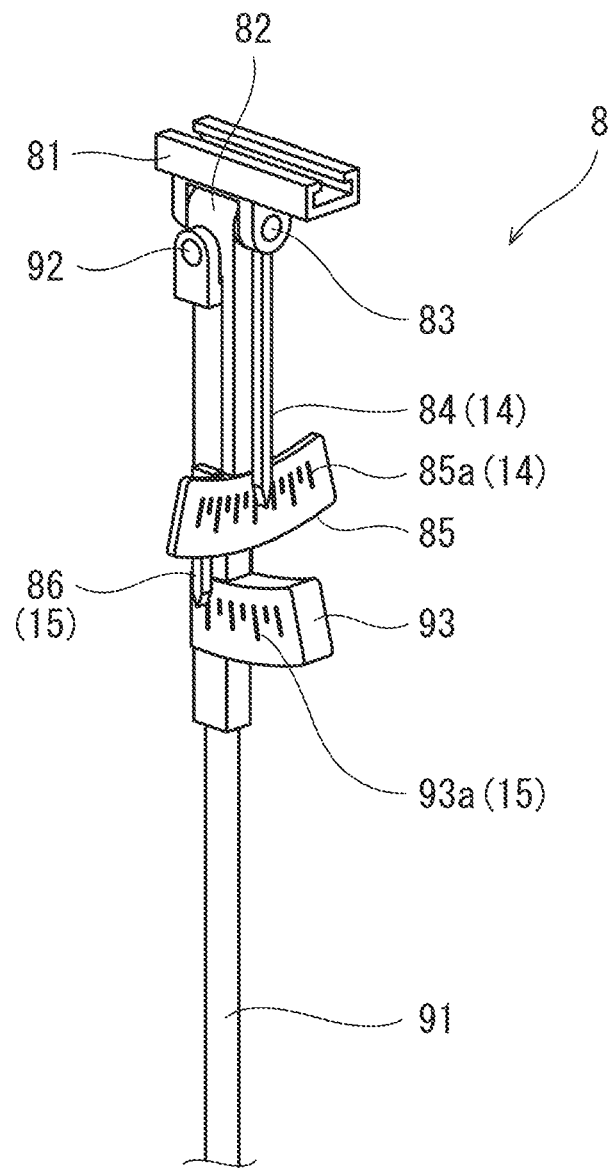
FIG. 4 is a perspective view of an alignment unit.

In the present embodiment, the alignment unit 8 is attachable to and removable from the movable body 4. Specifically, as shown in FIG. 4, the alignment unit 8 includes a linear alignment bar 91, which is to be placed along the tibia 26. In the present embodiment, the alignment bar 91 is swingable about a second swing shaft 83 parallel to the first swing shaft 63, and also swingable about a third swing shaft 92 extending in the Y-direction.

More specifically, the alignment unit 8 includes a grip 81 and a middle body 82 in addition to the alignment bar 91. The grip 81 includes a groove having an inverted T-shaped cross section, and the rail 49 of the movable body 4 is inserted in the groove. The middle body 82 is swingably connected to the grip 81 via the second swing shaft 83. The alignment bar 91 is swingably connected to the middle body 82 via the third swing shaft 92. Owing to the manner of fitting between the rail 49 and the grip 81, the relative position of the alignment unit 8 relative to the movable body 4 when the alignment unit 8 is mounted to the movable body 4 is shiftable in the X-direction.

The middle body 82 is provided with an arc-shaped graduation plate 85, which extends in the circumferential direction about the second swing shaft 83. Graduations 85a are formed on the graduation plate 85. The graduations 85a relate to a tilt angle about the X-axis, which is an angle about the second swing shaft 83 between the direction orthogonal to the first contact surface 21 of the femoral paddle 2A and the extending direction of the alignment bar 91. The grip 81 is provided with a pointer 84, which indicates the current angle of the direction orthogonal to the first contact surface 21 relative to the extending direction of the alignment bar 91 (in the present embodiment, the pointer 84 is immovable, and the graduation plate 85 swings together with the alignment bar 91). These graduations 85a and pointer 84 form a first angle indicator 14, which indicates the tilt angle about the X-axis.

The alignment bar 91 is provided with an arc-shaped graduation plate 93, which extends in the circumferential direction about the third swing shaft 92. Graduations 93a are formed on the graduation plate 93. The graduations 93a relate to a tilt angle about the Y-axis, which is an angle about the third swing shaft 92 between the direction orthogonal to the first contact surface 21 of the femoral paddle 2A and the extending direction of the alignment bar 91. The middle body 82 is provided with a pointer 86, which indicates the current angle of the direction orthogonal to the first contact surface 21 relative to the extending direction of the alignment bar 91 (in the present embodiment, the pointer 86 is immovable, and the graduation plate 93 swings together with the alignment bar 91). These graduations 93a and pointer 86 form a second angle indicator 15, which indicates the tilt angle about the Y-axis.

Next, a method of using the tibial resection assisting device 1 is described with reference to FIGS. 8A and 8B. First, a user (a surgeon) resects the distal portion of the femur 25. FIGS. 8A and 8B show the case of an extended position. Therefore, in this case, the distal end of the distal portion of the femur 25 is resected. However, in the case of a flexed position, the posterior end of the distal portion of the femur 25 is resected. Thereafter, the user inserts the femoral paddle 2A and the tibial paddle 2B between the resection surface 25a of the distal portion of the femur 25 and the proximal portion of the tibia 26, which is unresected, and operates the operating shaft 34 (the driving mechanism 10) to move the tibial paddle 2B away from the femoral paddle 2A. Through such an operation of the operating shaft 34, arbitrary tensile force can be applied to soft tissues around the knee joint, such as the collateral ligaments. Meanwhile, the tibial paddle 2B swings in accordance with the shape of the proximal portion of the tibia 26. Accordingly, which of the following is greater can be known (specifically by the paddle-to-paddle angle indicator 13): the degree of extension of the soft tissues, to which the tensile force is applied, at the medial side of the knee joint; or the degree of extension of the soft tissues, to which the tensile force is applied, at the lateral side of the knee joint.

While referring to the first distance indicator 11, the user expands the space between the femoral paddle 2A and the tibial paddle 2B to apply suitable tensile force to the soft tissues. Thereafter, while referring to the second distance indicator 12, the user fixes the reference guide 7 at a desired position. Then, the user forms a pair of drill holes in the tibia 26 through the through-holes 73 of the reference guide 7, and inserts the positioning pins 70 into the respective drill holes through the through-holes 73. It should be noted that, depending on the configuration of the positioning pins 70, the formation of the drill holes in the tibia 26 may be unnecessary. Subsequently, the user removes the tibial resection assisting device 1, attaches the tibial cutting guide 17 to the positioning pins 70 driven into the tibia 26 (inserts the positioning pins 70 in the respective through-holes 18), and resects the tibia 26 by a saw along the slits 19 of the tibial cutting guide 17.

As described above, in the tibial resection assisting device 1 of the present embodiment, the first contact surface 21 of the femoral paddle 2A is brought into contact with the resection surface 25a of the distal portion of the femur 25, and the reference guide 7 intended for positioning the tibial cutting guide 17 is movable in the Z-direction (i.e., the direction orthogonal to the first contact surface 21). Therefore, after resecting the distal portion of the femur 25, while using the resulting resection surface 25a of the distal portion of the femur 25 as a reference surface, the position of a resection surface of the proximal portion of the tibia 26 can be set. Moreover, since the movable body 4, to which the tibial paddle 2B is mounted via the swing body 6, is movable in the Z-direction, by expanding the space between the femoral paddle 2A and the tibial paddle 2B, suitable tensile force can be applied to the soft tissues around the knee joint, such as the collateral ligaments, and in such a state, the position of the resection surface of the proximal portion of the tibia 26 can be set. Furthermore, since the tibial paddle 2B is swingable and the paddle-to-paddle angle is changeable, which of the following is greater can be known: the degree of extension of the soft tissues, to which the tensile force is applied, at the medial side of the knee joint; or the degree of extension of the soft tissues, to which the tensile force is applied, at the lateral side of the knee joint.

In addition, since the tibial resection assisting device 1 includes the first distance indicator 11 and the second distance indicator 12, the surgeon can operate the driving mechanism 10 while checking, with the first distance indicator 11, the distance D1 from the first contact surface 21 to the second contact surface 22, and also, can move the reference guide 7 to a desired position by referring to the second distance indicator 12. Further, by subtracting the distance D1 indicated by the first distance indicator 11 from the distance D2 indicated by the second distance indicator 12, the amount of bone to be cut (i.e., the distance from the second contact surface 22 to the saw guide surface 19a of the tibial cutting guide 17) can also be known.

Figure 9A:
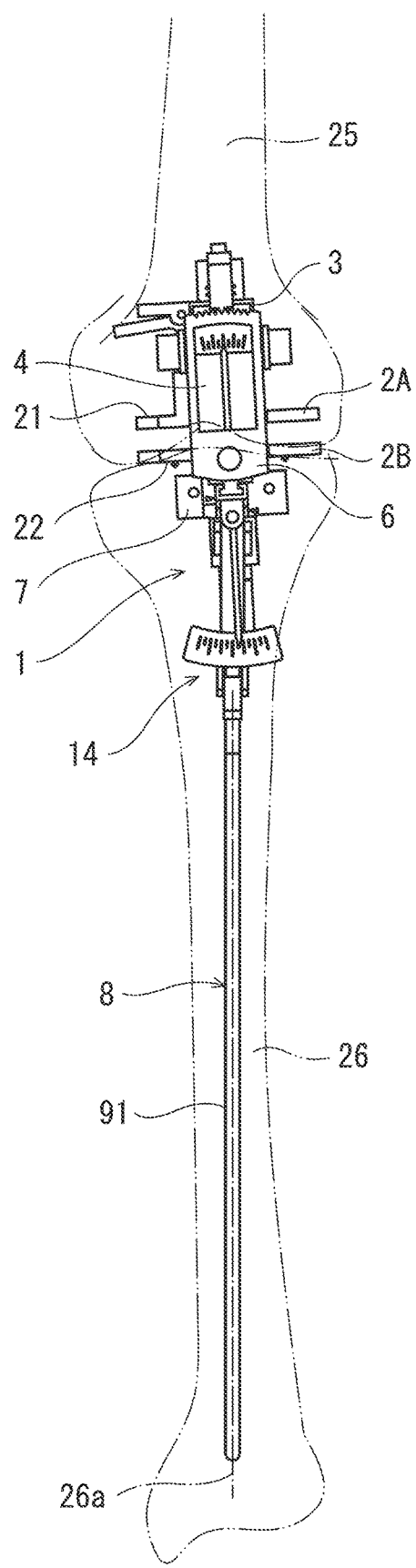
FIG. 9A is a front view of the tibial resection assisting device when an alignment bar is placed along a tibia.

Further, since the alignment unit 8 attachable to and removable from the movable body 4 includes the alignment bar 91, which is swingable about the second swing shaft 83, and the first angle indicator 14, by bringing the center line of the alignment bar 91 into coincidence with a tibial axis 26a as seen from the anterior side of the knee joint as shown in FIG. 9A, the angle of the first contact surface 21 of the femoral paddle 2A relative to the direction orthogonal to the tibial axis 26a can be known. Since the alignment unit 8 is attachable to and removable from the movable body 4, the insertion of the femoral paddle 2A and the tibial paddle 2B between the femur 25 and the tibia 26 and the operation of the driving mechanism 10 can be performed in a state where the alignment unit 8 is removed from the movable body 4.

Figure 9B:
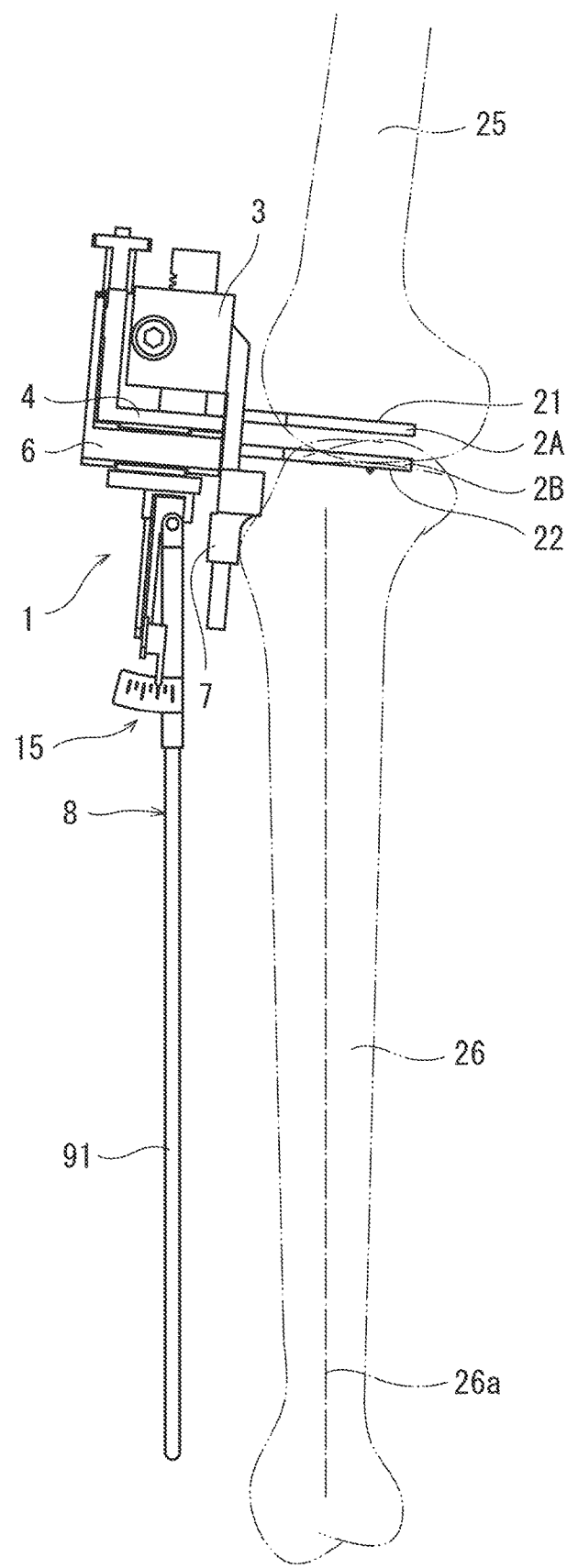
FIG. 9B is a side view of the tibial resection assisting device when the alignment bar is placed along the tibia.

Still further, since the alignment bar 91 is swingable also about the third swing shaft 92, and the alignment unit 8 includes the second angle indicator 15, by making the center line of the alignment bar 91 parallel to the tibial axis 26a as seen from a lateral side of the knee joint as in FIG. 9B (since the tibial axis 26a cannot be directly confirmed in actual TKA, the tibial axis 26a is inferred by referring to, for example, the anterior edge of the tibia), the angle of the first contact surface 21 of the femoral paddle 2A relative to the direction orthogonal to the tibial axis 26a can be known.

(Variations)

The present invention is not limited to the above-described embodiment. Various modifications can be made without departing from the scope of the present invention.

For example, the alignment bar 91 need not be swingable about both the second swing shaft 83 and the third swing shaft 92, but may be swingable only about the second swing shaft 83. Alternatively, the entire alignment unit 8 may be eliminated. It should be noted that the alignment unit 8 including the first angle indicator 14 (in some cases, including the first angle indicator 14 and the second angle indicator 15) may be mounted to the surgical operation device disclosed in Patent Literature 1. Such an application is also advantageous.

In the above-described embodiment, the alignment unit 8 is attachable to and removable from the movable body 4. Alternatively, the alignment unit 8 may be attachable to and removable from the base 3. In this case, the insertion of the femoral paddle 2A and the tibial paddle 2B between the femur 25 and the tibia 26 and the operation of the driving mechanism 10 can be performed in a state where the alignment unit 8 is removed from the base 3. Further alternatively, by mounting the alignment unit 8 to the swing body 6, the alignment bar 91 can be made swingable about the first swing shaft 63. In this case, the second swing shaft 83 is no longer necessary.

The reference guide 7 may move in the Z-direction together with the movable body 4. However, if the reference guide 7 is movable in the Z-direction independently of the movable body 4 as in the above-described embodiment, the position of the resection surface of the proximal portion of the tibia 26 can be set regardless of the distance D1 from the first contact surface 21 of the femoral paddle 2A to the second contact surface 22 of the tibial paddle 2B.

Further, in a case where a pair of drill holes is formed in the tibia 26 through the through-holes 73 of the reference guide 7, the tibial cutting guide 17 may be positioned by these drill holes. In this case, the tibial cutting guide 17 is provided not with the through-holes 18, but with a pair of pins fitted to the drill holes.

REFERENCE CHARACTERS LIST 1 tibial resection assisting device
10 driving mechanism
11 first distance indicator
12 second distance indicator
13 paddle-to-paddle angle indicator
14 first angle indicator
15 second angle indicator
16 angle fixing mechanism
17 tibial cutting guide
18 through-hole
19a saw guide surface
2A femoral paddle
2B tibial paddle
21 first contact surface
22 second contact surface
25 femur
25a resection surface
26 tibia
3 base
4 movable body
63 first swing shaft
7 reference guide
70 positioning pin
8 alignment unit
83 second swing shaft
92 third swing shaft
91 alignment bar

The invention claimed is:

1. A tibial resection assisting device for use in total knee arthroplasty, the tibial resection assisting device comprising:
a base configured to be disposed at an anterior side of a knee joint;
a femoral paddle mounted to the base, the femoral paddle including a first contact surface that is configured to be brought into contact with a resection surface of a distal portion of a femur;
a movable body mounted to the base such that the movable body is movable in a direction orthogonal to the first contact surface;
a tibial paddle including a second contact surface that is configured to be brought into contact with a proximal portion of a tibia that is unresected, the tibial paddle being mounted to the movable body, such that the tibial paddle is swingable about a first swing shaft that is configured to extend in an anterior-posterior direction of the knee joint, the anterior-posterior direction being parallel to the first contact surface;
a driving mechanism that moves the movable body in accordance with an operation amount;
a reference guide intended for positioning a tibial cutting guide that is used when resecting the proximal portion of the tibia, the reference guide being mounted to the base such that the reference guide is movable in the direction orthogonal to the first contact surface; and
an alignment unit that is attachable to and removable from either the movable body or the base, wherein
the alignment unit includes:
an alignment bar that is swingable about a second swing shaft, which is configured to extend in a lateral direction of the knee joint, and
an angle indicator that indicates an angle, about the second swing shaft, between the direction orthogonal to the first contact surface and an extending direction of the alignment bar.

2. The tibial resection assisting device according to claim 1, wherein
the reference guide is movable independently of the movable body.

3. The tibial resection assisting device according to claim 1, wherein
the reference guide includes a pair of through-holes, in which either a pair of positioning pins driven into the tibia, or a drill, is inserted, and
the tibial cutting guide is positioned by either the pair of positioning pins or a pair of drill holes formed by the drill.

4. The tibial resection assisting device according to claim 1, further comprising a first distance indicator that indicates a distance from the first contact surface to the second contact surface.

5. The tibial resection assisting device according to claim 1, wherein
the alignment bar is swingable about a third swing shaft parallel to the first swing shaft; and
the alignment unit includes another angle indicator that indicates an angle, about the third swing shaft, between the direction orthogonal to the first contact surface and the extending direction of the alignment bar.

6. The tibial resection assisting device according to claim 1, further comprising an angle fixing mechanism capable of fixing an angle between the first contact surface and the second contact surface.

7. The tibial resection assisting device according to claim 2, further comprising:
- a first distance indicator that indicates a distance from the first contact surface to the second contact surface; and
- a second distance indicator that indicates a distance from the first contact surface to a saw guide surface of the tibial cutting guide.

* * * * *